(12) United States Patent
Hickey et al.

(10) Patent No.: US 11,989,159 B2
(45) Date of Patent: May 21, 2024

(54) HYBRID SNAPSHOT OF A GLOBAL NAMESPACE

(71) Applicant: EMC IP Holding Company LLC, Hopkinton, MA (US)

(72) Inventors: Charles J. Hickey, Aptos, CA (US); George Mathew, Belmont, CA (US); Murthy V. Mamidi, San Jose, CA (US); Sampath Jayaram, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 326 days.

(21) Appl. No.: 17/127,887

(22) Filed: Dec. 18, 2020

(65) Prior Publication Data
US 2022/0197860 A1 Jun. 23, 2022

(51) Int. Cl.
*G06F 16/11* (2019.01)
*G06F 3/06* (2006.01)

(52) U.S. Cl.
CPC ............ *G06F 16/128* (2019.01); *G06F 3/062* (2013.01); *G06F 3/0643* (2013.01); *G06F 3/067* (2013.01); *G06F 3/0685* (2013.01)

(58) Field of Classification Search
USPC ....................................................... 707/609
See application file for complete search history.

(56) References Cited

U.S. PATENT DOCUMENTS

| | | | |
|---|---|---|---|
| 9,767,106 B1* | 9/2017 | Duggal | G06F 11/14 |
| 9,898,369 B1* | 2/2018 | Moghe | G06F 16/128 |
| 2015/0222705 A1* | 8/2015 | Stephens | G06F 3/067 |
| | | | 709/214 |
| 2019/0369875 A1* | 12/2019 | Meiri | G06F 3/067 |
| 2020/0250135 A1* | 8/2020 | Leis | G06F 16/185 |
| 2020/0285547 A1* | 9/2020 | Shukla | G06N 20/00 |
| 2020/0310915 A1* | 10/2020 | Alluboyina | G06F 11/1469 |

* cited by examiner

*Primary Examiner* — Hosain T Alam
*Assistant Examiner* — Nicholas E Allen
(74) *Attorney, Agent, or Firm* — WOMBLE BOND DICKINSON (US) LLP

(57) ABSTRACT

A method of generating a hybrid snapshot includes receiving a request to generate a snapshot of a distributed file system and identifying a first storage resource of the distributed file system and a second storage resource of the distributed file system based on the request. The method further includes generating the snapshot of the distributed file system, the snapshot including a data-full snapshot of the first storage resource and a data-less snapshot of the second storage resource.

17 Claims, 6 Drawing Sheets

100

HYBRID SNAPSHOT OF A GLOBAL NAMESPACE

FIELD OF THE INVENTION

Embodiments of the present invention relate generally to data storage systems. More particularly, embodiments of the invention relate to hybrid snapshots of a global name space.

BACKGROUND

A file system snapshot is a mechanism for providing a static view of an active file system at a specific point in time. Particularly, snapshots are used for file system roll-back, detecting changes of the file system between points in time, and for facilitating moves of data (e.g., to and from cloud based archives). A distributed namespace is a grouping of shared folders, files, or directories located on different servers or storage devices into one or more logically structured namespaces. Thus, folders distributed throughout a distributed file system may be accessed via a distributed namespace.

BRIEF DESCRIPTION OF THE DRAWINGS

Embodiments of the invention are illustrated by way of example, and not limitation, in the figures of the accompanying drawings in which like references indicate similar elements.

DETAILED DESCRIPTION

Figure 1:
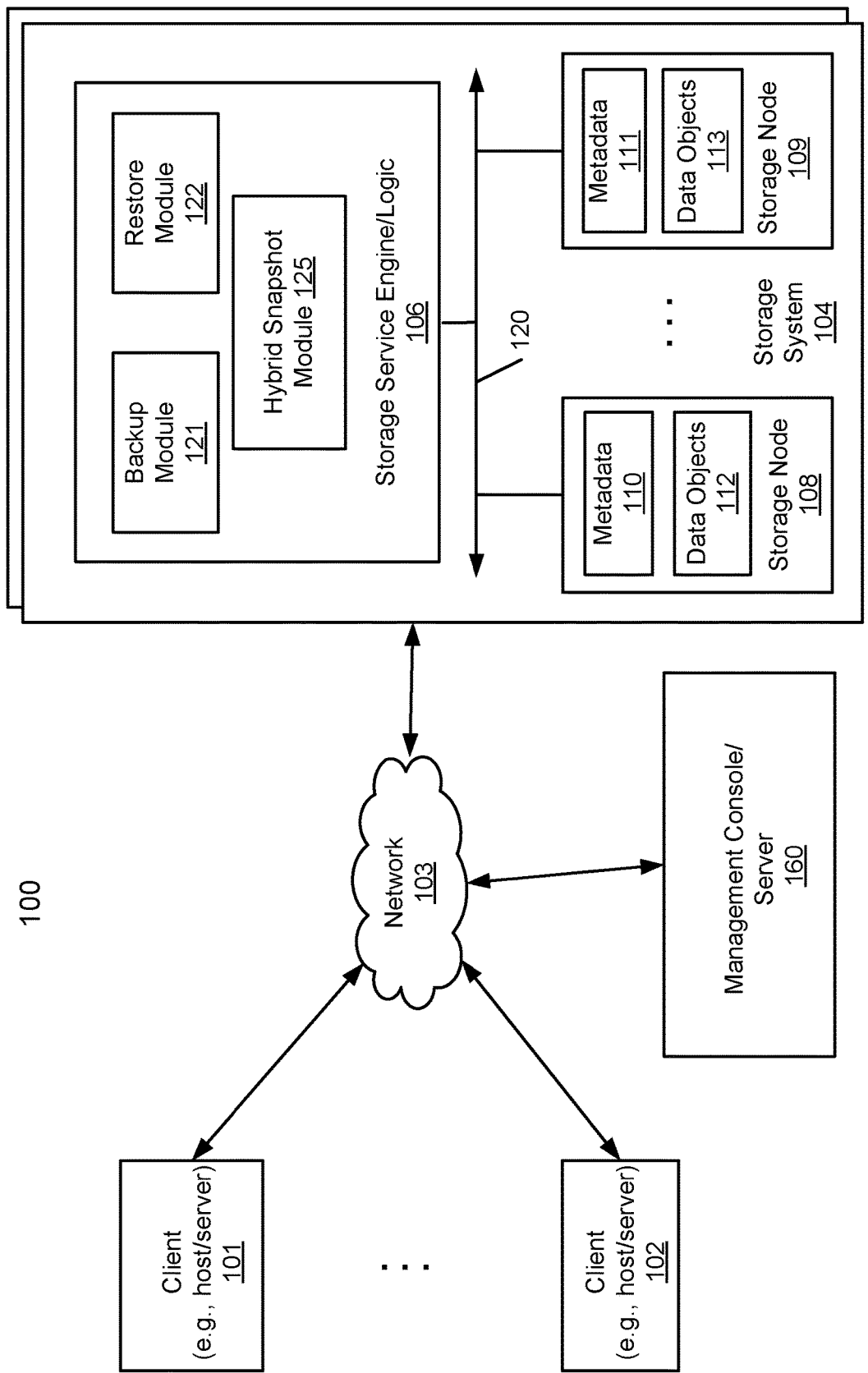
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Several types of storage resources, from fast and expensive to slow and economical can be used to store data in a distributed file system. A snapshot can be used to save a state of the distributed file system, even across different types of storage resources in the distributed file system. Traditional data-full snapshots preserve all data in the namespace including metadata and file data alike across all nodes of the namespace. However, in some circumstances data-full snapshots may waste a large amount of storage resources when certain portions of the namespace do not require a data-full snapshot. Traditional data-full snapshots may be unable to mitigate the resulting waste of resources from performing a full snapshot across all storage resources. Data-less snapshots, which preserve the namespace metadata but not file data, are compact and make efficient use of high performance storage. However, file data is not preserved so traditional data-less snapshots may not be used when any of the file data of the namespace should be preserved. Thus, with conventional snapshot, either an entirely data-full snapshot or an entirely data-less snapshot is performed on the entire namespace without the flexibility of selecting between the two on a fractional basis.

The present disclosure addresses the issues with conventional snapshots by providing for hybrid snapshots of a global namespace. A hybrid snapshot may provide the ability to select a mixture of data-full and data-less snapshots for different sets of files in a distributed namespace. Data-less or data-full snapshots may be selected for each set of files in the distributed namespace. The selection may be made using a unique identifier of a device (e.g., by name of device, or other identifier), by type of device (e.g., by storage tier, or device performance), or with any other selection scheme. For example, a data-less snapshot may be performed on all files placed in a high performance storage tier while a data-full snapshot may be performed on all files placed in slower storage tiers. Additionally, any combination of data-full and data-less snapshots may be performed for file sets of the distributed namespace.

Therefore, hybrid snapshots may save significant compute resources, increase system performance, and improve system reliability. Hybrid snapshots consist of less data than a full snapshot and therefore requires less disk space for data storage, fewer compute resources, and less network bandwidth during construction. Hybrid snapshots can reduce the amount of storage resources wasted during snapshot creation because data-less snapshots can be performed on portions of the distributed and/or tiered file systems that either do not need to be snapshotted or for which a data-full snapshot may be expensive to perform.

In one embodiment, a method of generating a hybrid snapshot includes receiving a request to generate a snapshot of a distributed file system, identifying a first storage resource of the distributed file system and a second storage resource of the distributed file system based on the request, and generating, by the processing device, the snapshot of the distributed file system. The snapshot may include a data-full snapshot of the first storage resource and a data-less snapshot of the second storage resource.

In one embodiment, the second storage resource stores metadata of the distributed file system and the first storage resource stores data of the distributed file system. In one embodiment, the request includes an indication of a first storage resource type to be included in the data-full snapshot and a second storage resource type to be included in the data-less snapshot. In one embodiment, the request includes a first identifier of the first storage resource and a second identifier of the second storage resource. In one embodiment, the first identifier of the first storage resource includes a name of the first storage resource and the second identifier of the second storage resource includes a name of the second storage resource. In one embodiment, the first storage resource type is a first tier of storage and the second storage resource type is a second tier of storage. In one embodiment, the second tier of storage is a high performance storage tier and the first tier of storage is a lower performance storage tier than the first tier of storage.

In one embodiment, a system includes a memory and a processing device operatively coupled to the memory to perform operations including receiving a request to generate a snapshot of a distributed file system, identifying a first storage resource of the distributed file system and a second storage resource of the distributed file system based on the request, and generating, by the processing device, the snapshot of the distributed file system. The snapshot may include a data-full snapshot of the first storage resource and a data-less snapshot of the second storage resource In one embodiment, a non-transitory machine-readable medium having instructions stored therein, which when executed by a processor, cause the processor to perform one or more operations, the operations including receiving a request to generate a snapshot of a distributed file system, identifying a first storage resource of the distributed file system and a second storage resource of the distributed file system based on the request, and generating, by the processing device, the snapshot of the distributed file system. The snapshot may include a data-full snapshot of the first storage resource and a data-less snapshot of the second storage resource FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic, and one or more storage nodes or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage nodes 108-109. Restore logic 122 is configured to retrieve and restore backup data from any one or more of storage nodes 108-109 back to a client (e.g., clients 101-102).

In one embodiment, service engine/logic 106 may include a hybrid snapshot module 125. Hybrid snapshot module 125 may create hybrid snapshots of a global namespace of a file system. For example, hybrid snapshot module 125 may receive a request to generate a snapshot and identify one or more devices to perform a data-full snapshot and one or more devices to perform a data-less snapshot. The hybrid snapshot module 125 may identify the devices based on identifiers received from the request. The snapshot request may be provided automatically via an automated snapshot and backup systems or from an administrator accessing the storage system through the management console 160.

In one example, a data domain file system (DDFS) may include manageable file sets, referred to herein as "M-Trees." An M-Tree may include a set of files in a self-contained file set referred to as a collection partition. The hybrid snapshot request may include one or more device identifiers or device type identifiers. The hybrid snapshot module 125 may receive the request with the identifiers and determine which file sets to perform a data-full or data-less snapshot. The hybrid snapshot may include data objects 112-113 and metadata 110-111 of the file system.

Storage nodes 108-109 may be implemented locally (e.g., single node operating environment) or remotely (e.g., multi-node operating environment) via interconnect 120, which may be a bus and/or a network (e.g., a storage network or a network similar to network 103). Storage nodes 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage nodes 108-109 may be located locally or remotely accessible over a network.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2A:
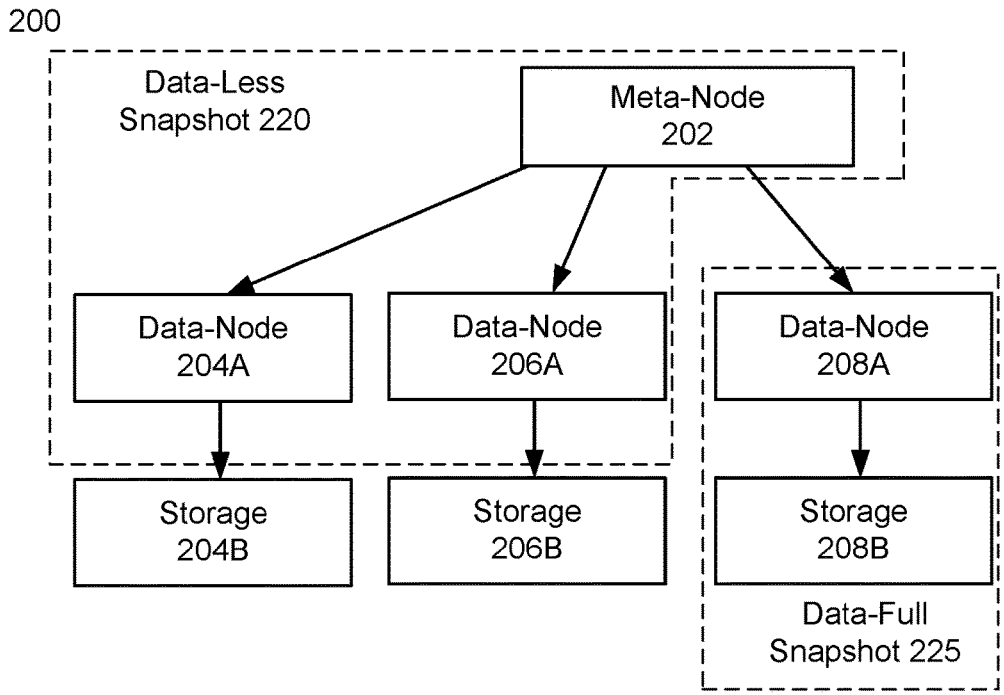
FIG. 2A is a block diagram illustrating an example hybrid snapshot of a file system namespace structure, according to one embodiment of the invention.

FIG. 2A is an example hybrid snapshot of a file system namespace 200 according to some embodiments. As depicted, the file system namespace 200 may include a meta-node 202 comprising metadata for the file system. The meta-node 202 may include pointers to data-nodes 204A, 206A, and 208A of the file system namespace 200. The data-nodes 204A, 206A, and 208A may include pointers to the actual locations in storage where data of a file is stored. For example, meta-node 202 may be a meta M-Tree comprising pointers to each of the data-nodes 204A, 206A, and 208A. Each of the data-nodes 204A, 206A, and 208A may be shadow M-Trees that include pointers to each of the corresponding storage locations in storage 204B, 206B, and 208B for each file of the shadow M-Tree.

An M-Tree may be a tree type data structure comprised of a root, one or more intermediate nodes, and several leaf nodes. An M-Tree may be constructed using a particular metric and may be searchable via range and k-th nearest neighbor queries or other queries. It should be noted that the file system namespace 200 structure may be any type of file system structure. In one embodiment, the data-nodes 204A, 206A, and 208A (e.g., M-Trees) may be distributed across several storage nodes, such as a cluster of storage nodes, data centers, or other distributed storage.

In one embodiment, each of the data-nodes 204A, 206A, and 208A may include several leaf nodes referred to as "inodes" comprising metadata for a file or data block and a pointer to the associated file or data block in storage 204B, 206B, and 208B (e.g., a block map). Upon making changes to a file, the file system may generate a new file and a new pointer to the new file in the data-node (e.g., in a shadow M-Tree). After creation of the new file, the file system may maintain the old file comprising the original data and a new file that includes the changes. Generally, a garbage collection operation may be performed periodically to remove the old file and the old pointer in the data-node to the old file. However, when a data-full snapshot is performed, the old file and the old pointer to the file is maintained rather than being garbage collected. Therefore, the state at the point in time that the snapshot is created can be persisted based on the state of the file system namespace 200 at the time of the snapshot. When a data-less snapshot is performed, the old files are allowed to be garbage collected but the metadata (i.e., the state) of the file system is persisted and not garbage collected.

As depicted in FIG. 2A, a snapshot may be performed on the file system namespace 200. In one example, a hybrid snapshot module, such as hybrid snapshot module 125 as described with respect to FIG. 1, may perform the snapshot.

In one embodiment, the hybrid snapshot module 125 may perform a data-less snapshot 220 on a first portion of the file system namespace 200 and a data-full snapshot 225 on a second portion of the file system namespace 200.

In one embodiment, the hybrid snapshot module may receive a request to perform a hybrid snapshot. The request may include an identifier of the data-node, or data-nodes on which to perform the data-full snapshot 225. For example, the request may include a unique identifier of data-node 208A. The hybrid snapshot module 125 may then perform the data-full snapshot 225 on the identified data-node 208A and perform a data-less snapshot 220 on all other data-nodes 204A and 206A of the file system namespace 200. The data-less snapshot 220 may persist only the state of the meta-node 202 and data nodes 204A and 206A. The current state of data files in storage 204B and 206B may not be included in the snapshot and thus the data files may be modified, deleted, or garbage collected. The data-full snapshot 225 may persist both the state of the data-node 208A and the data files in storage 208B.

Figure 2B:
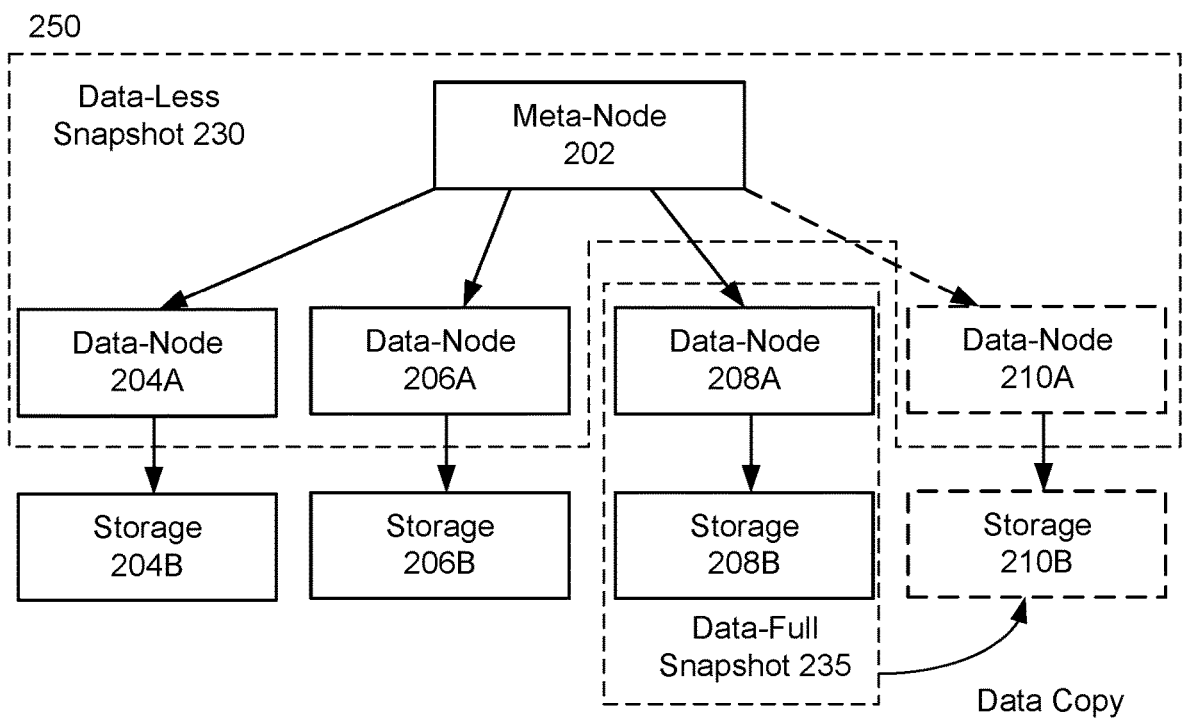
FIG. 2B is a block diagram illustrating an example hybrid snapshot of a file system namespace according to one embodiment of the disclosure.

FIG. 2B depicts an example hybrid snapshot of the file system namespace 250. The hybrid snapshot of the file system namespace 250 may be performed when adding additional storage to the file system. For example, the hybrid snapshot may be performed when an additional data-node 210A and storage 210B is added to the file system namespace 250. In one embodiment, the file system is a running file system in which the file sets stored at storage 204B, 206B, and 208B continue to be accessed or modified while the additional storage 210B is added to the file system. Therefore, a snapshot is performed on the file system namespace 250 to provide for a backup state of data to be copied to the additional storage 210B. As depicted, only the storage 208B from which data is copied to the additional storage 210B is included in a data-full snapshot 235 to protect the data that is to be copied to the additional storage 210B. A data-less snapshot 230 is performed on all other data-nodes 204A, 206A, and 210A of the file system namespace 250. After the snapshot is performed, data may be copied to the additional storage 210B for example, for load balancing within the file system namespace 250 because the storage nodes 204B, 206B, and 208B are full. Although only one data-node 208A and storage 208B is depicted as being a data-full snapshot, any number of data and storage nodes may be data-full snapshots in the hybrid snapshot of the file system namespace 250.

Figure 3:
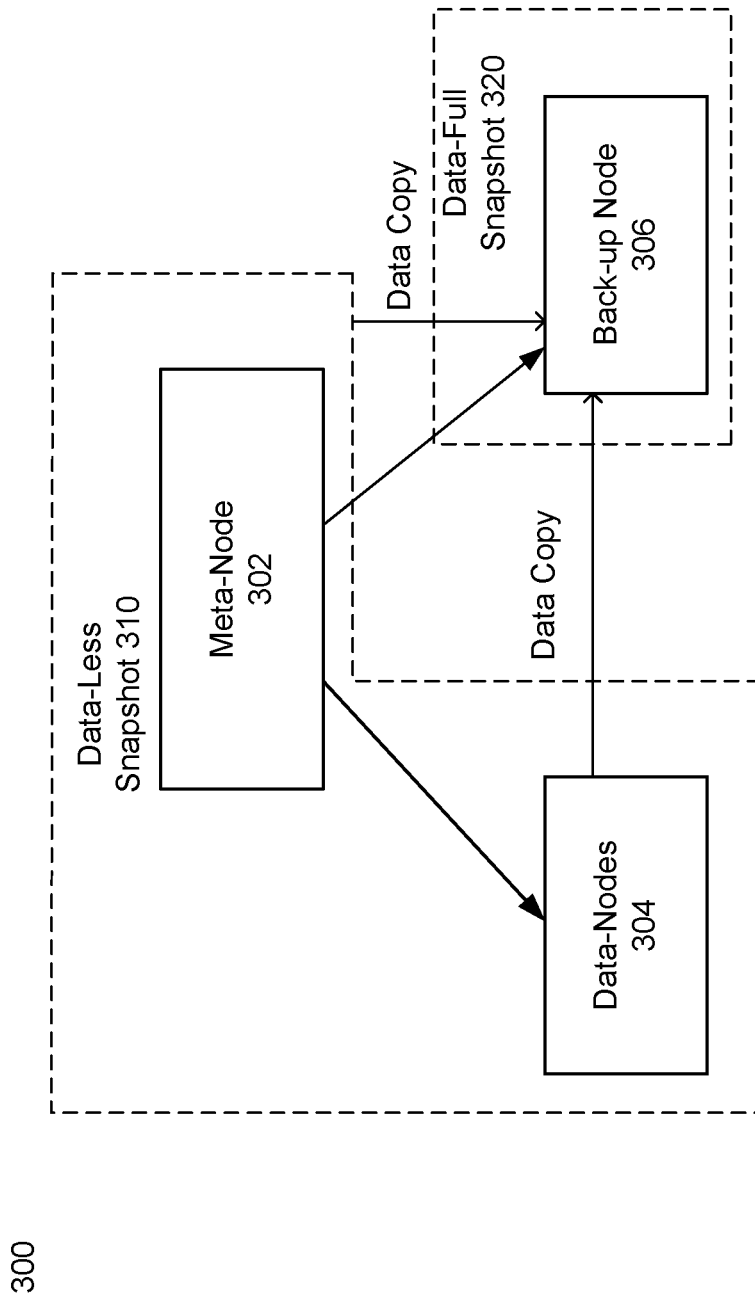
FIG. 3 is a block diagram illustrating another example hybrid snapshot of a file system namespace according to one embodiment of the disclosure.

FIG. 3 depicts an example hybrid snapshot of a distributed file system 300. In one example, a hybrid snapshot may be performed based on the types of storage resources. A data-full snapshot may be performed on one or more types of storage of the file system while a data-less snapshot may be performed for other types of storage of the file system. As depicted in FIG. 3, a hybrid snapshot based on types of storage resource may be performed for data recovery purposes in a file system (e.g., at a backup storage node). The file system 300 may include a meta-node 302 storing metadata of the file system 300. The meta-node 302 may be a high performance type of storage, such as a solid state drive. The meta-node 302 may further store pointers to data-nodes 304 that store the data of the file system 300. In one example, the meta-node is a meta M-Tree and the data-nodes 304 are each shadow M-Trees that include block maps to the locations of files in storage. The data-nodes 304 may include a slower and less expensive type of storage than the meta-node 302, such as a hard-disk drive. The back-up node 306 may be a long term offline type of data storage, such as cloud storage.

In one embodiment, to prepare for disaster recovery in the case of possible disaster, the entire state of the meta-node 302 and data-nodes 304 are copied to the backup node 306. First, all the data at the data-nodes 304 is copied to the back-up node 306. The hybrid snapshot is then performed on the entire file system 300 including the meta-node 302, the data-nodes 304, and the back-up node 306. As discussed above, the resources of the file system 300 on which to perform the data-full snapshot of the hybrid snapshot may be selected based on a type of storage. Therefore, the storage type of the back-up node 306 (e.g., cloud storage) may be identified as the type of storage on which the data-full snapshot 320 is to be performed. Accordingly, a data-less snapshot 310 is performed on the meta-node 302 and data-nodes 304 to force a sync up of the file system 300 and to persist the state of the file system 300. The state of the file system 300 is then copied to the back-up node 306. Therefore, the entire state as well as the data of the file system 300 may be stored at the back-up node. As such, all information required to reconstitute the file system 300 is located at the back-up node 306 (e.g., cloud storage) in the case of disaster.

Figure 4:
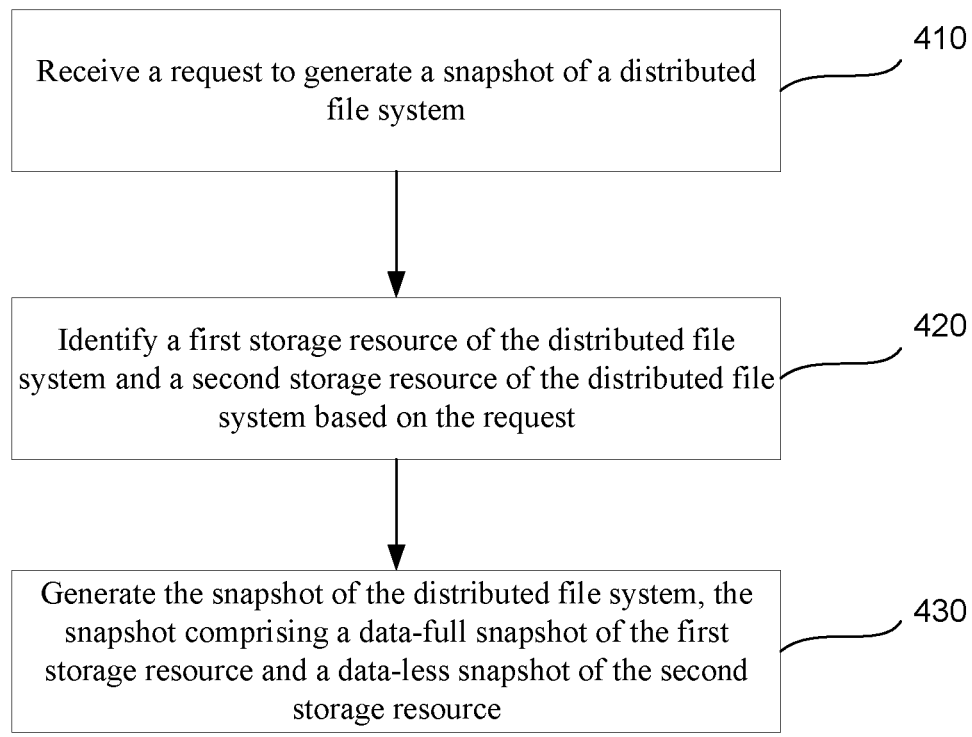
FIG. 4 is a flow diagram illustrating an example of creating a hybrid snapshot of a global namespace, according to one embodiment of the disclosure.

FIG. 4 is a flow diagram illustrating a process of creating a hybrid snapshot of a file system namespace according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by hybrid snapshot module 125 of FIG. 1.

Referring to FIG. 4, the process begins at block 410, where processing logic receives a request to generate a snapshot of a distributed file system. In one embodiment, the request includes a request to generate a hybrid snapshot in which a data full snapshot is generated for one or more storage resources of the file system and a data less snapshot is generated for one or more other storage resources of the file system. For example, the request may identify the storage resources, by name, by type, etc., to be included as data-full snapshots of the file system snapshot while other resources are data-less. In another example, the request may identify the storage resources to be included as data-less snapshots of the file system snapshot while all others are data-full. In yet another example, the request may identify the storage resources to be included as both data-full and data-less snapshots of the file system snapshot. The snapshot may be a consistent snapshot of the entire file system in which a data-full snapshot or data-less snapshot is performed on each storage node included in the file system. Thus, the state of the file system may be recoverable from the point in time that the snapshot is performed.

At block 420, the processing logic identifies a first storage resource of the distributed file system and a second storage resource of the distributed file system based on the request. In one embodiment, the request may identify the first storage resource or the second storage resource based on a name or other unique identifier of the first and second storage resources. In one example, the first and second storage resource may each be one or more storage nodes of the file system including both compute resources as well as storage resources. For example, the first storage resource may be a single storage node or several storage nodes of a same or similar type and the second storage resource may be a single storage node or several storage nodes that are different from the first storage resource. In one example, the request may identify the types of snapshot to be performed on different storage types, or tiers of storage, of the file system. For example, the file system may include a high performance tier, a mid-level performance tier, and a low performance tier. The high performance tier may be a type of fast access storage, such as a solid state drive (SSD), the mid-level performance tier may be a slower type of storage, such as a hard disk drive (HDD), and the low performance tier may be non-local storage such as cloud storage with slower access times. It should be noted that any number of storage tiers may be used and may include any type of storage. In one embodiment, the second storage resource may store metadata of the file system while the first storage resource may store data of the file system At block 430, the processing logic generates the snapshot of the distributed file system, the snapshot comprising a data-full snapshot of the first storage resource and a data-less snapshot of the second storage resource. In one example, the data-full snapshot of the first storage resource may persist both the state of the first storage resource as well as the data stored in the first storage resource. The data-less snapshot may persist the state of the second storage resource. For example, the data-less snapshot may save the metadata describing the second storage resource, such as the name of files, modification times, ownerships, and pointers to the locations that data files are stored.

In one embodiment, the processing device may determine, based on the request to generate the snapshot, on which storage resources that the data-full and data-less snapshots are to be performed. For example, the request may include identifiers, such as a name, of corresponding storage devices, or nodes, on which to perform either data-full or data-less snapshots. In another example, the request may include an indication of storage types (e.g., storage tiers, or any other storage device classification) on which to perform a data-full or data-less snapshot. For example, the first storage resource may be a first type of storage while the second storage resource may be a second type of storage. The first storage resource may include one or several storage nodes of the first type of storage and the second storage resource may include one or several storage nodes of the second type of storage. The request may indicate that data-full snapshots should be performed on all the storage nodes of the first storage type, and thus a data-full snapshot is performed on the first storage resource. Similarly, the request may indicate that data-less snapshots are to be performed on all storage nodes of the second storage type, and thus a data-less snapshot is performed on the second storage resource.

Figure 5:
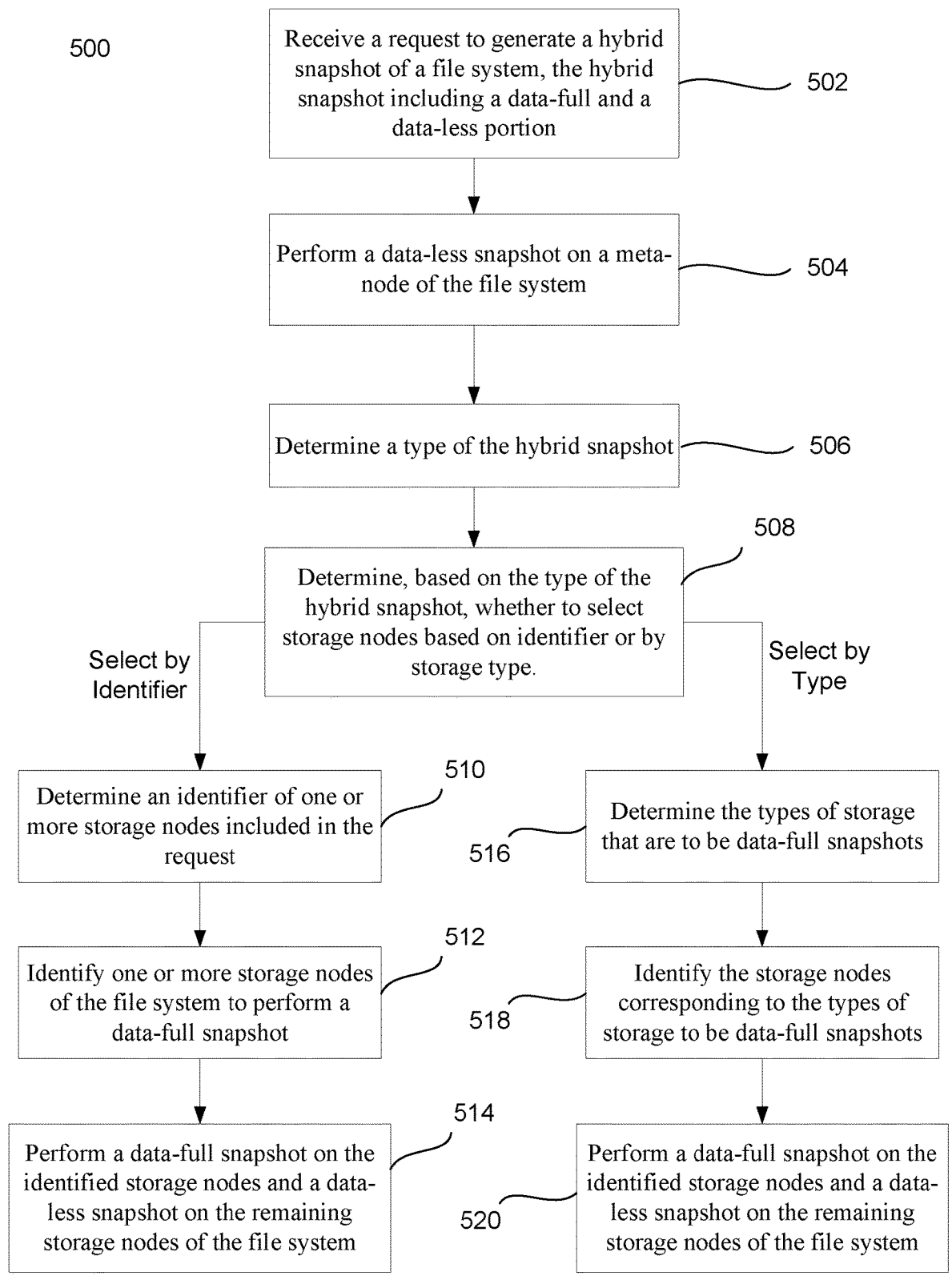
FIG. 5 is a flow diagram illustrating another example of creating a hybrid snapshot of a global namespace according to one embodiment.

FIG. 5 is a flow diagram illustrating a process of creating a hybrid snapshot of a global namespace according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by hybrid snapshot module of FIG. 1.

Referring to FIG. 5, the process begins at block 502, where processing logic receives a request to generate a hybrid snapshot of a file system, the hybrid snapshot to include a data-full and a data-less portion. The data-full portion of the snapshot may persist the state and the data included in the corresponding nodes of the file system. The data-less portion may persist the state of the corresponding nodes of the file system, such as metadata describing the data files associated with the nodes.

At block 504, the processing logic performs a data-less snapshot on a meta-node of the file system. The meta-node may include metadata describing the namespace of the file system as well as metadata pointing to data nodes that store the data of the file system. The meta-node may be located on a separate node of the file system from the data nodes.

At block 506, processing logic determines a type of the hybrid snapshot to be generated based on the request. The type of the hybrid snapshot may be an intended purpose of the hybrid snapshot, a method of performing the hybrid snapshot, or any other classification of the snapshot. For example, the type of the hybrid snapshot may be for performing load balancing of the file system or otherwise modifying the structure of the file system, such as adding an additional node as described with respect to FIG. 2B. In another embodiment, the type of the hybrid snapshot may be a data recovery type for backing up the entire file system (e.g., to cloud storage) as described with respect to FIG. 3.

At block 508, the processing logic determines, based on the type of the hybrid snapshot, whether to select storage nodes based on identifier or storage type. The type of the hybrid snapshot may determine how the storage nodes are selected to be data-full or data-less snapshots. In one embodiment, for a load balancing type hybrid snapshot, a unique identifier of the storage nodes may be used to select storage nodes to be data-full snapshots. In another embodiment, for a data recovery type hybrid snapshot, an indication of a type, or types, of storage node may be used to select which storage nodes to be data-full snapshots based on the type of storage of each of the storage nodes.

At block 510, in response to determining to select storage nodes using an identifier, the processing logic determines an identifier of one or more storage nodes included in the request. The request may include a unique identifier of each of the storage nodes of the file system to be data-full snapshot. In an alternative embodiment, the request may include the identifiers of the storage nodes to be data-less, or the identifiers of each storage node to be data-full and each storage node to be data-less.

At block 512, the processing logic identifies one or more storage nodes of the file system to perform a data-full snapshot based on storage node identifiers associated with the request. At block 514, the processing logic performs a data-full snapshot on the identified storage nodes and a data-less snapshot on the remaining nodes of the file system.

At block 516, the processing logic identifies the storage nodes corresponding to the types of storage to be data-full snapshots. The types of storage may be any classification of storage devices, such as by performance, groupings, whether the nodes are local or remote, etc. In one example, storage nodes may be grouped into tiers of storage. Thus, each tier of storage may be a type of storage used to select which storage nodes data-full or data-less snapshots are to be performed. For example, data-less snapshots may be performed on all high performance storage tiers of the file system while data-full snapshots may be performed on one or more lower tiers of storage. Accordingly, less storage space is consumed by a snapshot for high performance tiers.

At block 518, the processing logic identifies the storage nodes corresponding to the types of storage nodes indicated by the request to be data-full snapshots. At block 520, the processing logic performs a data-full snapshot on the identified storage nodes and a data-less snapshot on the remaining nodes of the file system.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
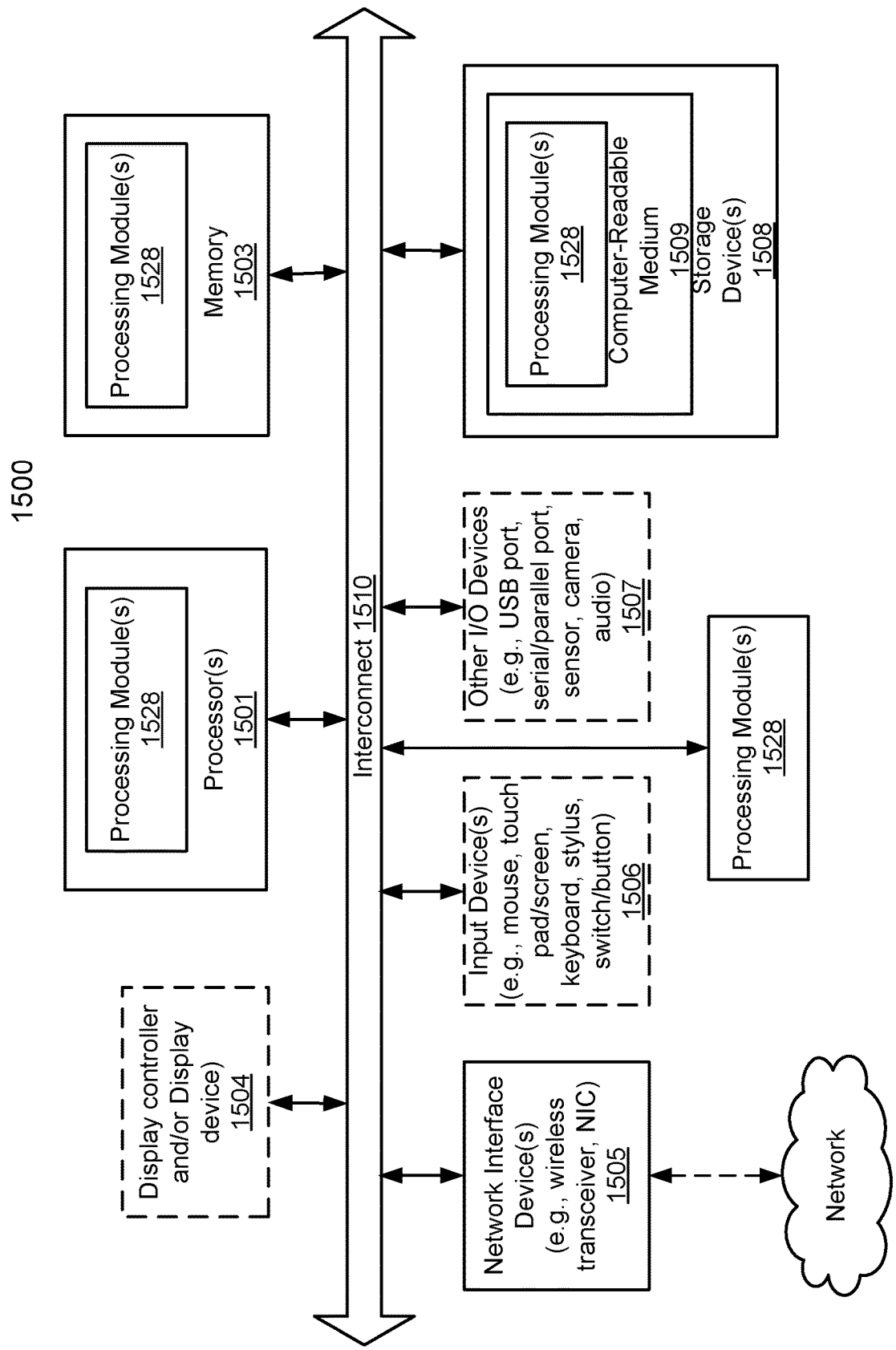
FIG. 6 is block diagram illustrating an example of a computing system that may be used in conjunction with one or more embodiments of the disclosure.

FIG. 6 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, the hybrid snapshot module 125 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the same software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
receiving a request to generate a hybrid snapshot of a distributed file system, wherein the request to generate the hybrid snapshot indicates a request to generate a data-full snapshot for a first storage resource and a data-less snapshot for a second storage resource, wherein the first storage resource corresponds to a first portion of a namespace of the distributed file system and comprises first metadata and first data, and the second storage resource corresponds to a second portion of the namespace of the distributed file system and comprises second metadata corresponding to second data, and wherein the first data is different from the second data;
identifying, by a processing device, the first storage resource of the distributed file system and the second storage resource of the distributed file system based on the request, wherein the first metadata is different from the second metadata, and the first data is different from the second data; and
generating, by the processing device, the hybrid snapshot of the distributed file system, wherein the hybrid snapshot comprises both the data-full snapshot and the data-less snapshot, the data-full snapshot comprising the first metadata and the first data, and the data-less snapshot comprising the second metadata without the second data, and wherein the hybrid snapshot comprises less data than a data-full snapshot of a combination of the first storage resource and the second storage resource.

2. The method of claim 1, wherein the request comprises an indication of a first storage resource type to be included in the data-full snapshot and a second storage resource type to be included in the data-less snapshot.

3. The method of claim 1, wherein the request comprises a first identifier of the first storage resource and a second identifier of the second storage resource.

4. The method of claim 3, wherein the first identifier of the first storage resource comprises a name of the first storage resource and the second identifier of the second storage resource comprises a name of the second storage resource.

5. The method of claim 2, wherein the first storage resource type is a first tier of storage and the second storage resource type is a second tier of storage.

6. The method of claim 5, wherein the second tier of storage is a high performance storage tier and the first tier of storage is a lower performance storage tier than the first tier of storage.

7. A system comprising:
a memory; and
a processing device operatively coupled to the memory, the processing device to perform operations comprising:
receiving a request to generate a hybrid snapshot of a distributed file system, wherein the request to generate the hybrid snapshot indicates a request to generate a data-full snapshot for a first storage resource and a data-less snapshot for a second storage resource, wherein the first storage resource corresponds to a first portion of a namespace of the distributed file system and comprises first metadata and first data, and the second storage resource corresponds to a second portion of the namespace of the distributed file system and comprises second metadata corresponding to second data, and wherein the first data is different from the second data;
identifying, by a processing device, the first storage resource of the distributed file system and the second storage resource of the distributed file system based on the request, wherein the first metadata is different from the second metadata, and the first data is different from the second data; and generating, by the processing device, the hybrid snapshot of the distributed file system, wherein the hybrid snapshot comprises both the data-full snapshot and the data-less snapshot, the data-full snapshot comprising the first metadata and the first data, and the data-less snapshot comprising the second metadata without the second data, and wherein the hybrid snapshot comprises less data than a data-full snapshot of a combination of the first storage resource and the second storage resource.

8. The system of claim 7, wherein the request comprises an indication of a first storage resource type to be included in the data-full snapshot and a second storage resource type to be included in the data-less snapshot.

9. The system of claim 7, wherein the request comprises a first identifier of the first storage resource and a second identifier of the second storage resource.

10. The system of claim 9, wherein the first identifier of the first storage resource comprises a name of the first storage resource and the second identifier of the second storage resource comprises a name of the second storage resource.

11. The system of claim 8, wherein the first storage resource type is a first tier of storage and the second storage resource type is a second tier of storage.

12. The system of claim 11, wherein the second tier of storage is a high performance storage tier and the first tier of storage is a lower performance storage tier than the first tier of storage.

13. A non-transitory machine-readable medium having instructions stored therein, which when executed by a processor, cause the processor to perform one or more operations, the operations comprising:

receiving a request to generate a hybrid snapshot of a distributed file system, wherein the request to generate the hybrid snapshot indicates a request to generate a data-full snapshot for a first storage resource and a data-less snapshot for a second storage resource, wherein the first storage resource corresponds to a first portion of a namespace of the distributed file system and comprises first metadata and first data, and the second storage resource corresponds to a second portion of the namespace of the distributed file system and comprises second metadata corresponding to second data, and wherein the first data is different from the second data;

identifying, by a processing device, the first storage resource of the distributed file system and the second storage resource of the distributed file system based on the request, wherein the first metadata is different from the second metadata, and the first data is different from the second data; and generating, by the processing device, the hybrid snapshot of the distributed file system, wherein the hybrid snapshot comprises both the data-full snapshot and the data-less snapshot, the data-full snapshot comprising the first metadata and the first data, and the data-less snapshot comprising the second metadata without the second data, and wherein the hybrid snapshot comprises less data than a data-full snapshot of a combination of the first storage resource and the second storage resource.

14. The non-transitory machine-readable medium of claim 13, wherein the request comprises a first identifier of the first storage resource and a second identifier of the second storage resource.

15. The non-transitory machine-readable medium of claim 14, wherein the first identifier of the first storage resource comprises a name of the first storage resource and the second identifier of the second storage resource comprises a name of the second storage resource.

16. The non-transitory machine-readable medium of claim 15, wherein a first storage resource type of the first storage resource is a first tier of storage and a second storage resource type of the second storage resource is a second tier of storage.

17. The non-transitory machine-readable medium of claim 16, wherein the second tier of storage is a high performance storage tier and the first tier of storage is a lower performance storage tier than the first tier of storage.

* * * * *